United States Patent [19]

Haaf et al.

[11] Patent Number: 5,081,185
[45] Date of Patent: Jan. 14, 1992

[54] POLYPHENYLENE ETHER COMPOSITION CHARACTERIZED BY IMPROVED MELT FLOW

[75] Inventors: William R. Haaf, Voorheesville; Gim F. Lee, Jr., Albany, both of N.Y.; Ernesto E. T. Sebok, Sao Paulo, Brazil

[73] Assignee: General Electric Co., Selkirk, N.Y.

[21] Appl. No.: 361,160

[22] Filed: Jun. 5, 1989

[51] Int. Cl.$^5$ .................. C08L 51/04; C08L 53/02; C08L 71/12

[52] U.S. Cl. .................. 525/68; 524/502; 524/504; 524/508; 525/92; 525/132; 525/390; 525/905

[58] Field of Search .............. 525/390, 905, 68, 132, 525/92

[56] References Cited

U.S. PATENT DOCUMENTS 4,923,932 5/1990 Katayose et al. .................. 525/390

Primary Examiner—Jacob Ziegler
Attorney, Agent, or Firm—Francis T. Coppa

[57] ABSTRACT

An improved polyphenylene ether composition is described herein, comprising at least two polyphenylene ether resins, one having an intrinsic viscosity of at least about 0.38 dl/g, and another having an intrinsic viscosity of no greater than about 0.33 dl/g.

27 Claims, No Drawings

POLYPHENYLENE ETHER COMPOSITION CHARACTERIZED BY IMPROVED MELT FLOW

This invention relates generally to thermoplastic compositions, and more specifically to polyphenylene ether-based compositions suitable for a wide range of processing techniques.

Polyphenylene ether resin (sometimes referred to by the terms "polyphenylene oxide", "PPE", or PPO ® resin) has enjoyed wide acceptance in the plastics industry because of its desirable physical and chemical properties, such as high heat resistance and dimensional stability.

One area in which PPE compositions have required improvement is melt flow capability, i.e., the ability to flow freely at elevated temperatures during various processing stages, such as extrusion and molding. Poor melt flow capability or "processability" can result in the commercial exclusion of materials which otherwise possess an enviable set of properties.

As pointed out in the teachings of G. Lee, Jr.'s U.S. Pat. No. 4,154,712, processability can be improved by decreasing the molecular weight of the PPE. However, lower molecular weights sometimes adversely affect other properties, such as impact strength. Impact strength in the Lee, Jr. patent is maintained by the presence of an elastomeric block copolymer of a vinyl aromatic compound and a conjugated diene, along with a plasticizer such as triphenyl phosphate.

Even in the relatively short period since the issuance of the Lee, Jr. patent, extrusion and molding methods for thermoplastics have undergone improvements so that processing times could be reduced, and larger parts could be fabricated more efficiently. However, these improvements have required concurrent improvements in the resins themselves, i.e., ever-higher levels of melt flow, without substantial sacrifice of any of the other key physical properties of the material. Thus, one can readily discern the need for new thermoplastic compositions which satisfy all of these requirements.

SUMMARY OF THE INVENTION

In response to the industry requirements set forth above, the applicants for the present invention have discovered polymer compositions which comprise:

(a) at least one polyphenylene ether resin having an intrinsic viscosity of at least about 0.38 dl/g; and (b) at least one polyphenylene ether resin having an intrinsic viscosity no greater than about 0.33 dl/g, each of said viscosities being measured in a chloroform solution at 25° C.

The use of a blend of two PPE resins as specified above unexpectedly resulted in a level of increased melt flow which was much greater than one would predict from the calculated melt flow for a PPE resin having an intrinsic viscosity (IV) which was the average of that of two such PPE resins. Furthermore, the desirable physical properties, such as heat distortion temperature, tensile strength, and flexural modulus, are substantially maintained.

Included within the scope of this invention are compositions which contain relatively high amounts of the blend of PPE resins, as further described below.

Furthermore, various embodiments of this invention include the presence of other suitable components, such as plasticizers, flame retardants, fillers, and various block copolymer materials, as also described below.

This invention also includes a method for preparing PPE resins having improved melt flow capabilities.

DETAILED DESCRIPTION OF THE INVENTION

The PPE resins of this invention are generally well-known and readily available. Many are described in two applications for Sterling B. Brown et al., Ser. No. 210,547 and Ser. No. 210,266, both filed on June 23, 1988 and incorporated herein by reference. Both homopolymer and copolymer polyphenylene ethers are within the scope of this invention.

The preferred PPE resins are homo- and copolymers of the formula

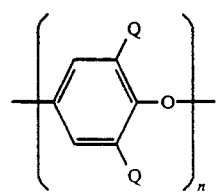

wherein the oxygen ether atom of one unit is connected to the benzene nucleus of the next adjoining unit; n is an integer of at least 50; and each Q is a monovalent substituent such as hydrogen, halogen, hydrocarbon groups, halohydrocarbon groups having at least two carbon atoms between the halogen atom and the phenyl nucleus, hydrocarbonoxy groups, and halohydrocarbonoxy groups having at least two carbon atoms between the halogen atom and the phenyl nucleus. In preferred embodiments, each Q is an alkyl group having from 1-4 carbon atoms, such as methyl, ethyl, propyl, and the like. In the most preferred embodiments, at least one of the polyphenylene ether resins is derived from a monomer selected from the group consisting of 2,6-dimethyl phenol; 2,3,6-trimethyl phenol; and mixtures of these monomers.

The preparation of PPE resins is well-known in the art and is described, for example, in U.S. Pat. Nos. 3,306,874; 3,306,875; and 3,432,469 of Allan Hay; and U.S. Pat. Nos. 3,257,357 and 3,257,358 of Gelu Stamatoff, all incorporated herein by reference.

As noted above, one of the PPE resins must have an "intrinsic viscosity" (a measurement well-known in the art, which generally correlates with molecular weight) of at least about 0.38 dl/g, while the other must have an intrinsic viscosity of no greater than about 0.33 dl/g.

Methods of preparing PPE resins and controlling the molecular weight thereof are known in the art, as shown, for example, in U.S. Pat. Nos. 4,252,913 and 4,154,712, issued to Katchman et al and Lee, Jr., respectively, and incorporated herein by reference.

In preferred embodiments, component (a), i.e., the higher molecular weight PPE, has an intrinsic viscosity of at least about 0.40 dl/g, and most preferably, at least about 0.45 dl/g.

Furthermore, preferred embodiments call for the lower molecular weight PPE, component (b), to have an intrinsic viscosity of no greater than about 0.30 dl/g; more preferably, no greater than about 0.25 dl/g; and most preferably, no greater than about 0.20 dl/g.

When viewed together, a preferred PPE resin includes component (a) with an IV value of at least about 0.40 dl/g, with component (b) having an IV value of no greater than about 0.25 dl/g. However, those skilled in the art will be able to select other appropriate PPE IV values for a particular processing operation without undue experimentation, based on factors such as molding temperature, throughput volume, physical property requirements, and the presence or absence of other components in the composition.

In some preferred embodiments, the weight ratio of component (a) to component (b) ranges from about 60:40 to about 40:60. However, under some circumstances, it is desirable that component (a) constitute at least about 70% by weight of the total polyphenylene ether resin in the composition.

Moreover, in some instances, it is desirable that the composition contain very high levels of PPE resin. For example, when greater heat resistance is required, the composition may comprise at least about 80% by weight PPE resin, based on total composition weight. In still other circumstances, the composition may comprise at least about 85% (or even 90%) by weight PPE resin.

Materials which sometimes enhance the impact strength of the compositions are not critical to this invention, but are sometimes desirable. They are usually of high molecular weight, and include natural rubbers, synthetic rubbers, and thermoplastic elastomers. They may be homopolymers as well as copolymers, including random, block and graft copolymers derived from various suitable monomers such as butadiene, possibly in combination with a vinyl aromatic compound like styrene.

Specific examples of such materials are elastomeric block copolymers and core/shell polymers. The block copolymers are well-known in the art and are described, for example, in application Ser. No. 254,519 of G. Lee, Jr., filed Oct. 6, 1988, application Ser. No. 282,081 of W. Abolins et al, filed Dec. 9, 1988; application Ser. No. 244,489 of G. Lee, Jr., filed Sept. 14, 1988; and in U.S. Pat. No. 4,997,612 of J. Gianchandani et al, all of which are incorporated herein by reference. Some of the patents mentioned above also contain descriptions of suitable block copolymers.

Commercial examples of block copolymers are the Kraton ® D and Kraton ® G materials, available from Shell Chemical Company.

The preferred block copolymers of this invention are characterized by an A-B-A$^1$ structure, wherein terminal blocks A and A$^1$ are the same or different, and are polymerized vinyl aromatic hydrocarbons, and center block B is a polymerized conjugated diene, the molecular weight of B being higher than the combined molecular weights of A and A$^1$. The conjugated diene block can be non-hydrogenated, partially hydrogenated, or entirely hydrogenated.

In some especially preferred embodiments, each A and A$^1$ block of this type of copolymer is styrene, and the B block is ethylene-butylene, often derived from post-hydrogenated butadiene.

Some of the core-shell materials suitable for this invention are described in U.S. Pat. Nos. 3,944,631 of Yu et al; 4,681,915 of Bates et al; and 4,684,696 of Bates et al, all incorporated herein by reference. Preferred core-shell materials include a cross-linked acrylate rubber core, such as polybutyl acrylate. Surrounding this core is a shell-like structure of cross-linked vinyl aromatic resin, preferably polystyrene, which surrounds and interpenetrates the cross-linked core.

The impact modifier is generally present at about 1 percent to about 10 percent by weight, based on the weight of the entire composition; a specific amount will of course be determined by end use requirements for the composition.

Compositions of this invention sometimes include at least one polyolefin resin, usually present at about 0.1% to about 10% by weight, based on the total weight of the composition. Polyolefin resins and methods for their preparation are known in the art and described, for example, in European Patent 0,095,098; in the above-mentioned application Ser. No. 254,519, and in U.S. Pat. No. 4,166,055, the last-mentioned patent also being incorporated herein by reference. Illustrative polyolefin resins are polyethylene, polypropylene, and polyisobutylene, with the preferred homopolymer being polyethylene.

Copolymers of polyolefins may also be used, such as copolymers of ethylene with alpha olefins like propylene and 4-methylpentene-1.

In preferred embodiments, the polyolefin resin has a melt index of less than about 30 grams/10 minutes, and for some applications, less than about 5 grams/10 minutes. Specific examples of polyolefins in this category are the linear low density polyethylene (LLDPE) copolymers, such as those described in U.S. Pat. Nos. 4,584,334 and 4,076,698, both incorporated herein by reference, and in the above-mentioned application Ser. No. 254,519.

Various vinyl aromatic polymers may sometimes also be included in the compositions of this invention, such as homopolystyrene, polychlorostyrene, polyvinyl toluene, and rubber-modified polystyrene (sometimes referred to as "HIPS"), as well as mixtures of these materials. Mention should also be made of styrene-containing copolymers such as styrene-acrylonitrile copolymers (SAN), styrene-maleic anhydride copolymers, polyalpha-methylstyrene, and copolymers of ethylvinylbenzene and divinylbenzene. The amount of vinyl aromatic polymer present depends upon the particular properties contemplated, and usually ranges from about 5% to about 90% by weight (based on total composition weight), and more preferably, about 20% to about 60% by weight.

Various additives which impart a variety of attributes to these compositions are also within the scope of this invention. Most are well-known in the art, as are their effective levels and methods of incorporation. Examples of such additives are flame retardants, plasticizers, stabilizers (e.g., oxidative, thermal, and ultraviolet light), fillers, reinforcing agents, lubricants, colorants, dyes, pigments, drip retardants, and other processing aids. Some of these additives are mentioned in the following examples; others are disclosed in many of the references described above.

The compositions of this invention may be prepared by well-known procedures. Preferably, the ingredients are combined as a premix blend, and then extruded on a single or twin screw extruder, cooled, and chopped into pellets. The pellets are then molded into articles of a desired shape and size.

Thus, another aspect of this invention is a method for preparing a polyphenylene ether composition having high melt flow characteristics and good physical properties, wherein said method comprises mixing a PPE resin having an intrinsic viscosity of at least about 0.38 dl/g with a PPE resin having an intrinsic viscosity no greater than about 0.33 dl/g.

The following examples are provided to illustrate various embodiments of this invention. It is to be understood, however, that the embodiments are given for the purpose of illustration only, and do not and should not be regarded as limiting the invention to any of the specific materials or conditions described therein.

EXAMPLES

Unless otherwise indicated, the PPE resins were each poly(2,6-dimethyl-1,4-phenylene) ether. Intrinsic viscosity (IV) was measured in chloroform at 25° C.

The components in each example were dry-blended and compounded, using a 30 mm Werner & Pfleiderer twin-screw extruder. The components are expressed as parts by weight, unless otherwise indicated.

The extrudate was quenched and pelletized. The products were then molded on a Toshiba injection molding machine (8 oz. barrel capacity) into various test specimens.

EXAMPLE 1

The following compositions were prepared as described above:

| | Sample Number[a] | | |
|---|---|---|---|
| Component | 1* | 2* | 3 |
| PPE (0.46 IV) | 44.9 | 0 | 0 |
| PPE (0.40 IV) | 0 | 44.9 | 38.0 |
| PPE (0.19 IV) | 0 | 0 | 6.9 |
| HIPS[b] | 44.9 | 44.9 | 44.9 |
| F.R./Plasticizer[c] | 13.0 | 13.0 | 13.0 |
| TDP[d] | 0.45 | 0.45 | 0.45 |
| Polyethylene[e] | 1.4 | 1.4 | 1.4 |
| ZnS[f] | 0.13 | 0.13 | 0.13 |
| ZnO[g] | 0.13 | 0.13 | 0.13 |

[a] Amounts given in parts-by-weight (pbw)
[b] Rubber-Modified Polystyrene
[c] Flame Retardant/Plasticizer: Santicizer ® from Monsanto.
[d] Tridecyl Phosphite
[e] Linear Low density Polyethylene
[f] Zinc Sulfide
[g] Zinc Oxide
(*) Control Samples Tests on molded pieces resulted in the following properties:

TABLE 1

| | Sample Number | | |
|---|---|---|---|
| Property | 1* | 2* | 3 |
| Flame Retardance (⅛")[a] | 2.4, V0 | 3.6, V0 | 3.7, V0 |
| Flame Retardance (1/16")[b] | 4.9, V0 | 4.7, V0 | 6.0, V1 |
| Heat Distortion | | | |
| Temperature (264 psi)[c] | 178 | 182 | 183 |
| Flow Channel (inches)[d] | 24.5 | 26.4 | 30.0 |
| Izod Impact (notched) Strength (ft. lb/in)[e] | 4.5 | 2.9 | 1.8 |
| Dynatup Impact Strength[f] (in-lbs) | 230 | 120 | 67 |
| Melt Viscosity (540° F.)[g] | | | |
| 1500 sec$^{-1}$ | 1101 | 960 | 934 |
| 100 sec$^{-1}$ | 5099 | 4405 | 3714 |

[a] UL94
[b] UL94
[c] ASTM D648
[d] Measured at 520° F.-527° F., 10,000 psi
[e] ASTM D256
[f] ASTM D3763
[g] D8385 (Measured in poises)

The flow channel length for sample 3, which contains the mixture of PPE resins, is much higher than the value predicted for a sample having an IV equal to the average IV of the components in sample 3.

Furthermore, although there is some decrease in flame retardance and impact values as compared to control samples 1 and 2, the overall physical properties for sample 3 are still acceptable for many end use applications.

EXAMPLE 2

The following compositions were prepared as described above. Each component is identical to that used in Example 1, unless otherwise indicated.

| | Sample Number | | |
|---|---|---|---|
| Component | 4* | 5* | 6 |
| PPE (0.46 IV) | 67.3 | 0 | 60 |
| PPE (0.40 IV) | 0 | 67.3 | 0 |
| PPE (0.19 IV) | 0 | 0 | 7.3 |
| HIPS | 22.4 | 22.4 | 22.4 |
| F.R./Plasticizer | 13.0 | 13.0 | 13.0 |
| TDP | 0.45 | 0.45 | 0.45 |
| Polyethylene | 1.4 | 1.4 | 1.4 |
| ZnS | 0.13 | 0.13 | 0.13 |
| ZnO | 0.13 | 0.13 | 0.13 |

*Control Samples

Tests on molded pieces resulted in the following properties, as measured according to the standards described in Table 1.

TABLE 2

| | Sample Number | | |
|---|---|---|---|
| Property | 4* | 5* | 6 |
| Flame Retardance (⅛") | 1.6, V0 | 1.6, V0 | 1.9, V0 |
| Flame Retardance (1/16") | 2.8, V0 | 2.4, V0 | 3.3, V0 |
| Heat Distortion | | | |
| Temperature (264 psi) | 211 | 207 | 209 |
| Flow Channel (inches) | 13.2 | 15.7 | 16.1 |
| Izod Impact (Notched) Strength (ft. lb/in) | 3.2 | 2.5 | 2.5 |
| Dynatup Impact Strength (in-lbs) | 406 | 125 | 172 |
| Melt Viscosity (540° F.) | | | |
| (Poises) 1500 sec$^{-1}$ | 1556 | 1520 | 1413 |
| 100 sec$^{-1}$ | 6148 | 6221 | 5221 |

*Control Samples

The flow channel length for sample 6, which contains a mixture of PPE resins according to this invention, is much higher than one would expect for a sample having an IV equal to the average of that of the components in sample 6.

The other physical properties for sample 6 were generally comparable to those of control samples 4 and 5, although flame-out times were slightly higher, and impact strength values were somewhat variable. In general, the impact strength of sample 6 can be enhanced by the presence of one of the impact modifiers discussed above.

EXAMPLE 3

The following compositions were prepared as described above. Each component is identical to that used in Example 1, unless otherwise indicated.

| | Sample Number | | |
|---|---|---|---|
| Component | 7* | 8* | 9 |
| PPE (0.46 IV) | 67.3 | 0 | 52 |
| PPE (0.40 IV) | 0 | 67.3 | 0 |
| PPE (0.19 IV) | 0 | 0 | 15.3 |
| HIPS | 22.4 | 22.4 | 22.4 |
| F.R./Plasticizer | 13.0 | 13.0 | 13.0 |
| TDP | 0.45 | 0.45 | 0.45 |
| Polyethylene | 1.4 | 1.4 | 1.4 |
| ZnS | 0.13 | 0.13 | 0.13 |

-continued

| Component | Sample Number | | |
|---|---|---|---|
| | 7* | 8* | 9 |
| ZnO | 0.13 | 0.13 | 0.13 |

*Control Samples

Tests on molded pieces resulted in the following properties:

TABLE 2

| Property | Sample Number | | |
|---|---|---|---|
| | 7* | 8* | 9 |
| Flame Retardance (⅛") | 1.9, V0 | 1.3, V0 | 1.0, V0 |
| Flame Retardance (1/16") | 2.7, V0 | 3.3, V0 | 1.9, V0 |
| Heat Distortion Temperature (264 psi) | 214 | 215 | 212 |
| Flow Channel (inches) | 16.2 | 21.4 | 25.5 |
| Izod Impact (Notched) Strength (ft. lb/in) | 2.9 | 2.1 | 1.4 |
| Dynatup Impact Strength (in-lbs) | 162 | 155 | 72 |
| Melt Viscosity (540° F.) | | | |
| (Poises) 1500 sec$^{-1}$ | NA** | NA** | NA** |
| 100 sec$^{-1}$ | NA** | NA** | NA** |

*Control Samples
**Not Available

The flow channel length for sample 9, which contains a mixture of PPE resins according to this invention, is again higher than one would expect by averaging the IV values for the individual PPE components in sample 9 and then extrapolating a melt flow value.

The physical properties for sample 9 are generally comparable to those of control samples 7 and 8, although impact values are somewhat decreased. These values can be increased as mentioned in Example 2.

EXAMPLE 4

The following compositions were prepared as described above. Each component is identical to that used in Example 1, unless otherwise indicated.

| Component | Sample Number | | |
|---|---|---|---|
| | 10* | 11* | 12 |
| PPE (0.46 IV) | 59.0 | 0.0 | 50.0 |
| PPE (0.40 IV) | 0 | 59.0 | 0 |
| PPE (0.19 IV) | 0 | 0 | 9.0 |
| HIPS | 41.0 | 41.0 | 41.0 |
| F.R./Plasticizer | 4.5 | 4.5 | 4.5 |
| TDP | 1.0 | 1.0 | 1.0 |
| Polyethylene | 1.5 | 1.5 | 1.5 |
| ZnS | 0.15 | 0.15 | 0.15 |
| ZnO | 0.15 | 0.15 | 0.15 |

*Control Samples

Tests on molded pieces resulted in the following properties:

TABLE 4

| Property | Sample Number | | |
|---|---|---|---|
| | 10* | 11* | 12 |
| Flame Retardance (⅛") | 5.1, V1 | 4.6, V0 | 4.2, V0 |
| Flame Retardance (1/16") | 10.8, V1 | 7.3, V1 | 9.7, V1 |
| Heat Distortion Temperature (264 psi) | 224 | 235 | 233 |
| Flow Channel (inches) | 22.3 | 23.7 | 25.0 |
| Izod Impact (Notched) Strength (ft. lb/in) | 4.3 | 2.9 | 2.6 |
| Dynatup Impact Strength (in-lbs) | 267 | 304 | 158 |
| Melt Viscosity (540° F.) | | | |

TABLE 4-continued

| Property | Sample Number | | |
|---|---|---|---|
| | 10* | 11* | 12 |
| (Poises) 1500 sec$^{-1}$ | 1756 | 1688 | 1739 |
| 100 sec$^{-1}$ | 7879 | 7351 | 7564 |

*Control Samples

The flow channel length for sample 12, which contains a mixture of PPE resins according to this invention, is again higher than one would predict by averaging the IV values for the individual PPE components in sample 12.

The physical properties for sample 12 were somewhat similar to those of control samples 10 and 11, although Dynatup impact values were somewhat lower. These values could be increased by the use of an impact modifier, as described above.

It should of course be understood that this invention may be modified in various aspects related to composition ingredients and processing details, such modifications falling within the scope of the claims which follow.

We claim:
1. A polymer composition comprising:
   (a) a polyphenylene ether resin having an intrinsic viscosity of at least about 0.38 dl/g; and
   (b) a polyphenylene ether resin having an intrinsic viscosity no greater than about 0.33 dl/g,
   each of said viscosities being measured in a chloroform solution at 25° C.
2. The composition of claim 1 wherein at least one of the polyphenylene ether resins is derived from a monomer selected from the group consisting of 2,6-dimethyl phenol, 2,3,6-trimethyl phenol, and mixtures thereof.
3. The composition of claim 1 wherein at least one of the resins is poly(2,6-dimethyl-1,4-phenylene)ether.
4. The composition of claim 1 wherein component (a) has an intrinsic viscosity of at least about 0.40 dl/g.
5. The composition of claim 4 wherein component (b) has an intrinsic viscosity no greater than about 0.30 dl/g.
6. The composition of claim 5 wherein component (b) has an intrinsic viscosity no greater than about 0.25 dl/g.
7. The composition of claim 1 wherein component (a) has an intrinsic viscosity of at least about 0.45 dl/g.
8. The composition of claim 7 wherein component (b) has an intrinsic viscosity no greater than about 0.25 dl/g.
9. The composition of claim 8 wherein component (b) has an intrinsic viscosity no greater than about 0.20 dl/g.
10. The composition of claim 1 wherein component (a) comprises at least about 70% by weight of the total polyphenylene ether resin in the composition.
11. The composition of claim 1 wherein the weight ratio of component (a) to component (b) ranges from about 60:40 to about 40:60.
12. The composition of claim 1, further comprising an impact modifier.
13. The composition of claim 12, wherein the impact modifier is selected from the group consisting of core/shell polymers and elastomeric block copolymers.
14. The composition of claim 13, wherein the block copolymer is characterized by an A-B-A$^1$ structure, wherein terminal blocks A and A$^1$ are the same or different, and are polymerized vinyl aromatic hydrocar- bons, and center block B is a polymerized conjugated diene which may be non-hydrogenated or partially or entirely hydrogenated, the molecular weight of B being higher than the combined molecular weights of A and $A^1$.

15. The composition of claim 14, wherein each A and $A^1$ block is derived from styrene, and the B block is ethylene-butylene.

16. The composition of claim 1, further comprising about 0.1% to about 10% by weight of at least one polyolefin resin, said weight percentages based on the total weight of the composition.

17. The composition of claim 16, wherein the olefin resin has a melt index of less than about 30 grams/10 minutes.

18. The composition of claim 16, further comprising a block copolymer.

19. The composition of claim 1, comprising at least about 80% by weight polyphenylene ether resin, based on total composition weight.

20. The composition of claim 19, comprising at least about 90% by weight polyphenylene ether resin, based on total composition weight.

21. The composition of claim 1, further comprising a vinyl aromatic polymer.

22. The composition of claim 21, wherein the vinyl aromatic polymer is selected from the group consisting of homopolystyrene, styrene copolymers, rubber-modified polystyrene, and mixtures of these materials.

23. The composition of claim 1, further comprising at least one material selected from the group consisting of flame retardants, plasticizers, stabilizers, fillers, and reinforcing agents, lubricants, colorants, dyes, pigments, and drip retardants.

24. The composition of claim 21, further comprising at least one material selected from the group consisting of flame retardants, plasticizers, stabilizers, fillers, reinforcing agents, lubricants, colorants, dyes, pigments, and drip retardants.

25. A method for preparing a polyphenylene ether composition having high melt flow characteristics and good physical properties, wherein said method comprises mixing a polyphenylene ether resin having an intrinsic viscosity of at least about 0.38 dl/g with a polyphenylene ether resin having an intrinsic viscosity no greater than about 0.33 dl/g.

26. The polymer composition of claim 1, wherein each polyphenylene ether resin is a homopolymer or copolymer comprising a plurality of structural units having the formula

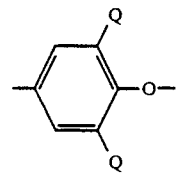

wherein the oxygen ether atom of one unit is connected to the benzene nucleus of the next adjoining unit; and each Q is an alkyl group having from 1–4 carbon atoms.

27. The polymer composition of claim 1, wherein each polyphenylene ether resin is derived from a monomer selected from the group consisting of 2,6-dimethyl phenol; 2,3,6-trimethyl phenol; and mixtures of these monomers.

* * * * *